W. G. BEWS.
MEASURING DEVICE.
APPLICATION FILED JULY 21, 1919.
1,332,158.
Patented Feb. 24, 1920.
2 SHEETS—SHEET 2.
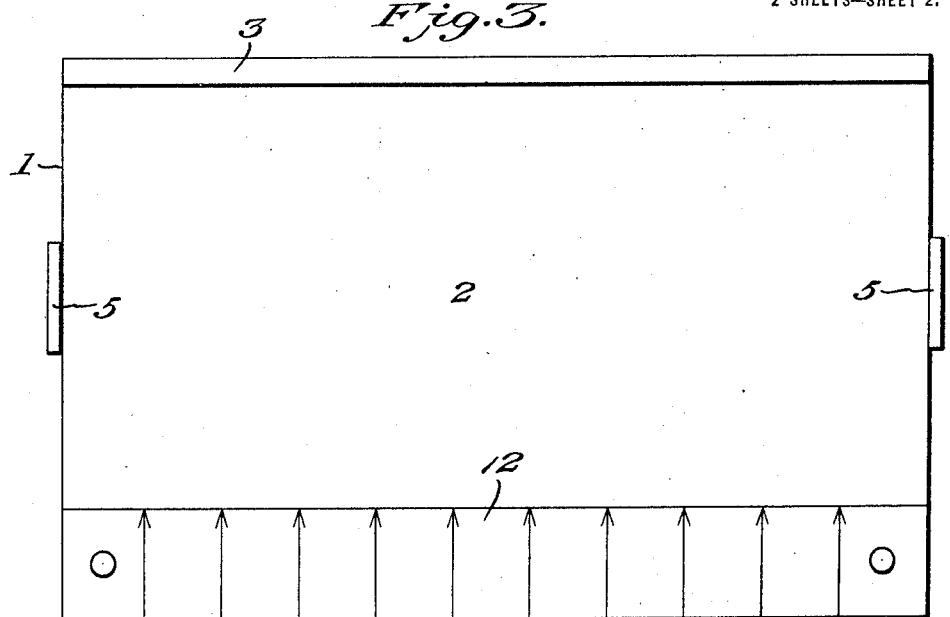
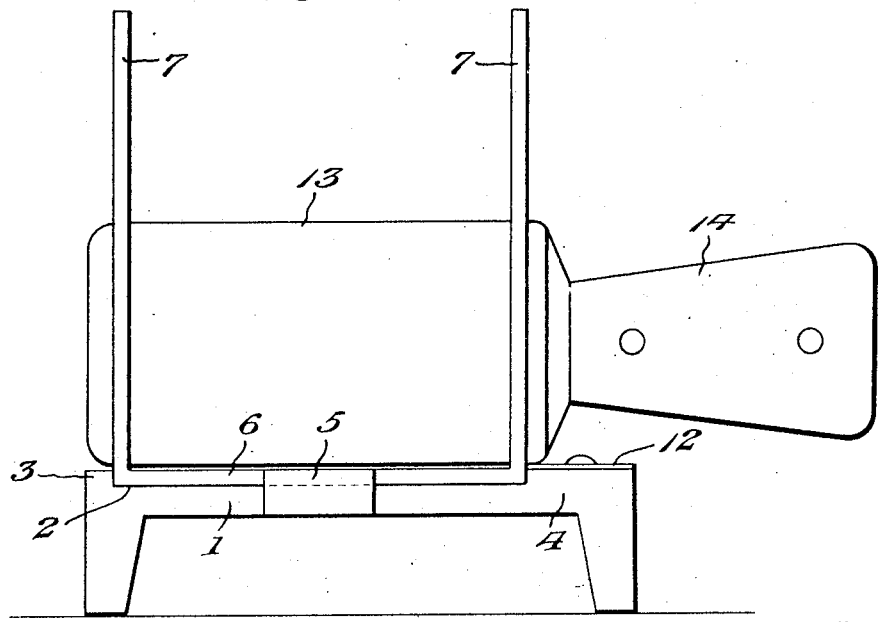

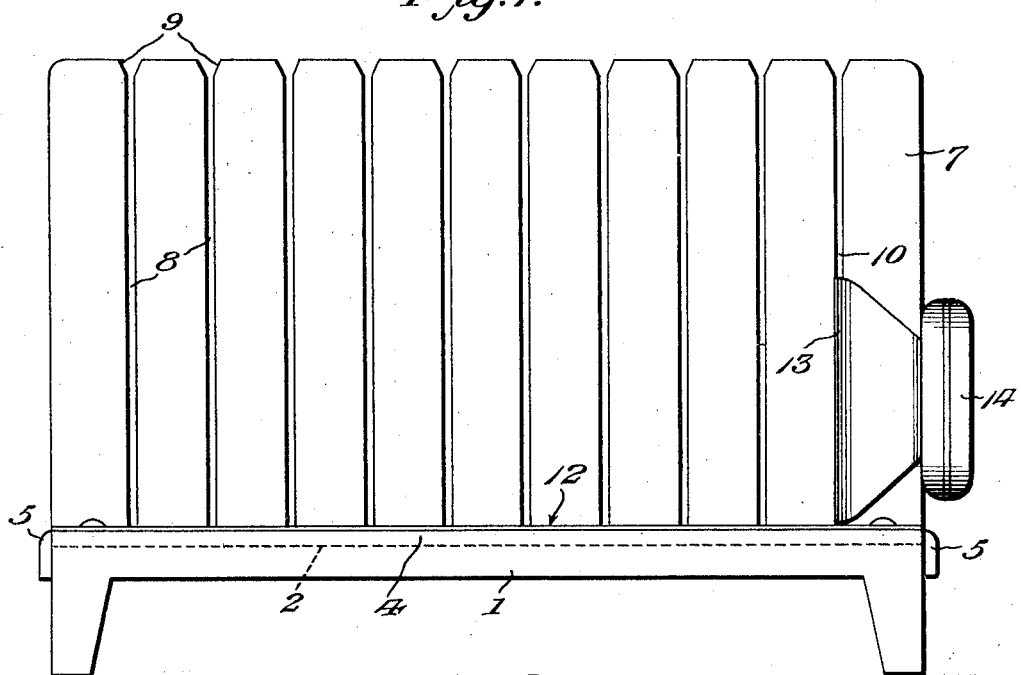

UNITED STATES PATENT OFFICE.

WESLEY GILBERT BEWS, OF TACOMA, WASHINGTON.

MEASURING DEVICE.

1,332,158. Specification of Letters Patent. Patented Feb. 24, 1920.

Application filed July 21, 1919. Serial No. 312,159.

*To all whom it may concern:*

Be it known that I, WESLEY GILBERT BEWS, a citizen of the United States, residing at Tacoma, in the county of Pierce and State of Washington, have invented new and useful Improvements in Measuring Devices, of which the following is a specification.

This invention relates to measuring devices adapted to be used in connection with articles sold in standard sizes, and capable of being cut or divided to produce a portion of measured or desired quantity or weight.

The improved measuring device includes side walls, between which the articles are to be positioned, the said side walls being formed with guiding slots to permit the introduction of a cutter thereinto, which when moved longitudinally of the slot will divide the article. One end slot of the device is formed to receive a stop member, against which the end of the article to be divided is to be positioned, the remaining slots being arranged relatively to each other and to the end slot in accordance with the known volume of the standard article for which the particular measure is designed, so that through the use of a particular slot for guiding the cutter, a predetermined quantity, weight, or measure of the standard article may be divided therefrom.

In the drawings:—

Figure 1 is a view in elevation of the improved measuring device.

Fig. 2 is a plan view of the same.

Fig. 3 is a plan view of the base, with the measuring device proper removed therefrom.

Fig. 4 is an end elevation of the device.

The improved measuring device comprises the base 1 longitudinally recessed at 2, for the reception of the measuring device proper, the recess 2 being arranged more closely adjacent one side edge of the base than the other, whereby to provide a narrow ledge 3 on one side, and a comparatively broad bearing surface 4 on the opposite side. The ends of the base have upstanding ledges 5, about centrally of the width of the recess 2, the base being thus provided with end and side guards to receive the measuring device proper.

The measure proper comprises a base 6, preferably wood or the like. from the side edges of which, rise side walls 7. The measure proper is of a length and width to fit within the side margins of the slot 2 and between the flanges 5, so that while said measure is securely held while in use, it may be readily removed from the base when desired for cleaning.

The side walls 7 of the measure are provided with vertically extending slots 8, which slots open through the upper edge of the side walls, the walls of said slot being flared at their entrance as at 9. One such slot as 10 arranged at one end, is designed to receive a stop, to be hereinafter described and the remaining slots are arranged with particular relation to this slot 10. In this arrangement, the respective slots will be spaced from the slot 10 and from each other, in accordance with the contemplated division of the article for which the particular measure is designed, in order that an accurate division may be made to produce a portion having a definite weight or volume. For example, if measure is designed for butter, a one pound roll of creamery butter measuring six and a half inches, the respective slots will be arranged with relation to this weight and length, so that any desired weight or volume may be obtained by operating through the proper slot.

The broad bearing surface 4 is utilized to receive a scale 12, which extends lengthwise from said surface and has opposite each slot a particular weight or quantity produced by dividing the article in the measure through said slot. Of course the scale may be arranged for ounces, table spoons, cups or other measure and the slots marked on the scale to indicate the relative volume or weight in accordance with the unit measure, that is so many ounces or a portion of an ounce, so many cups or a portion of a cup, and so on.

The stop is in the form of a blade 13 having an offset handle 14, the blade being of a thickness to readily enter the slot, so that it may be positioned in the alined end slots and serve as a stop against which the end of the article to be operated upon may be positioned. Furthermore, in this form the stop serves as a convenient scoop or blade by which the severed portion may be readily removed from the measure. The measure is held on the base merely by its weight and position between the flat walls and flanges and may thus be readily removed when necessary, enabling the device which is primarily designed for household use, although capable of other use, to be readily kept in a cleanly sanitary condition.

Having described the invention what I claim is:—

A measure comprising a base formed with a longitudinally extending slot, said base in one direction beyond the slot forming a broad bearing surface, a measure proper removably seated in the base and comprising upright walls vertically slotted, a stop including a blade and offset handle adapted to coöperate with slots to form a limit for the article being measured and a scale having indicating data for the respective slots and secured upon the bearing surface of the base.

In testimony whereof I affix my signature.

WESLEY GILBERT BEWS.